July 14, 1931. H. S. ALEXANDER ET AL 1,815,020
METHOD OF AND APPARATUS FOR SEPARATING SHEET MATERIALS
Filed Aug. 17, 1928   4 Sheets-Sheet 3
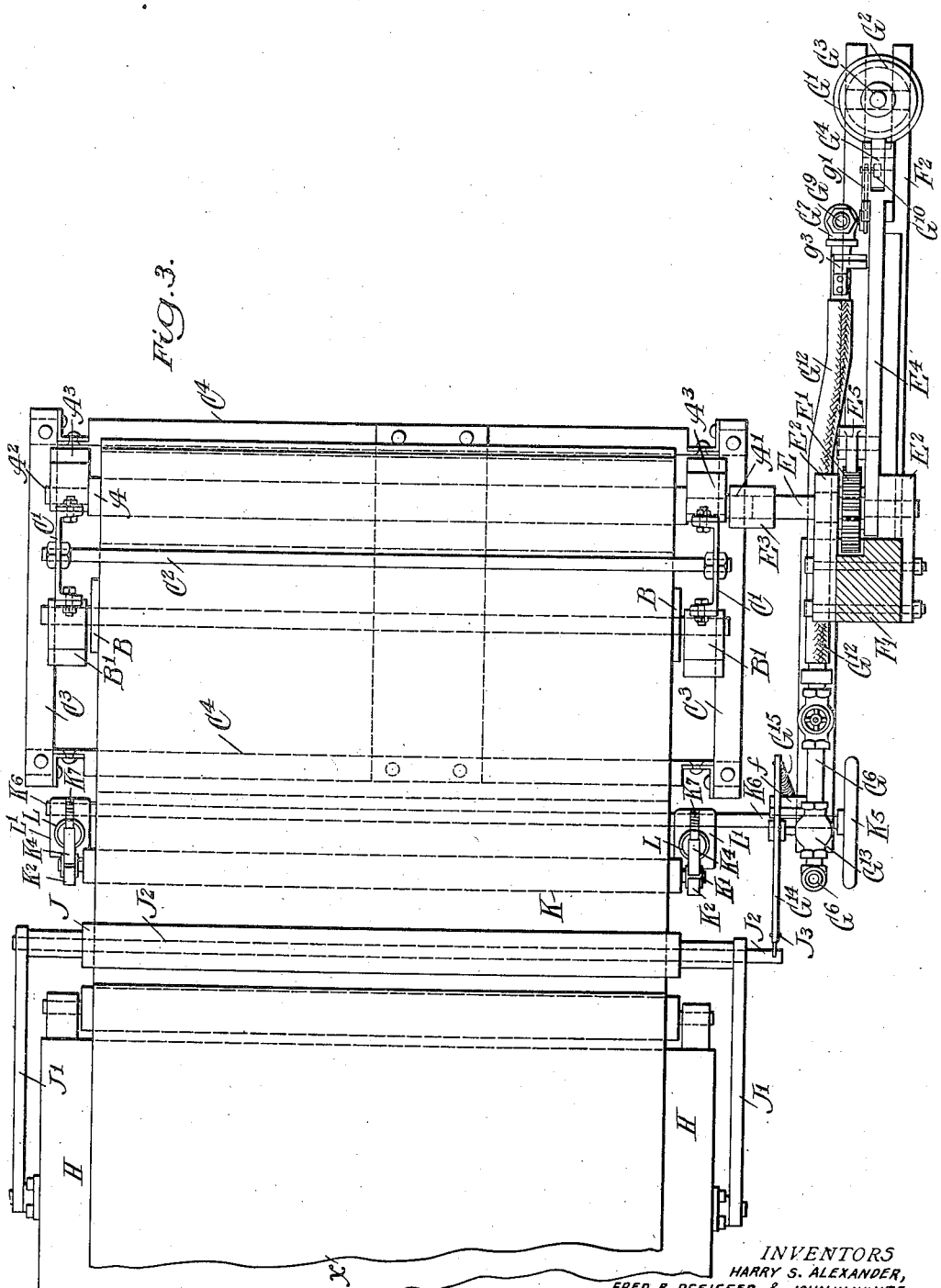
INVENTORS
HARRY S. ALEXANDER,
FRED B. PFEIFFER, & JOHN W. WHITE.
BY
ATTORNEYS

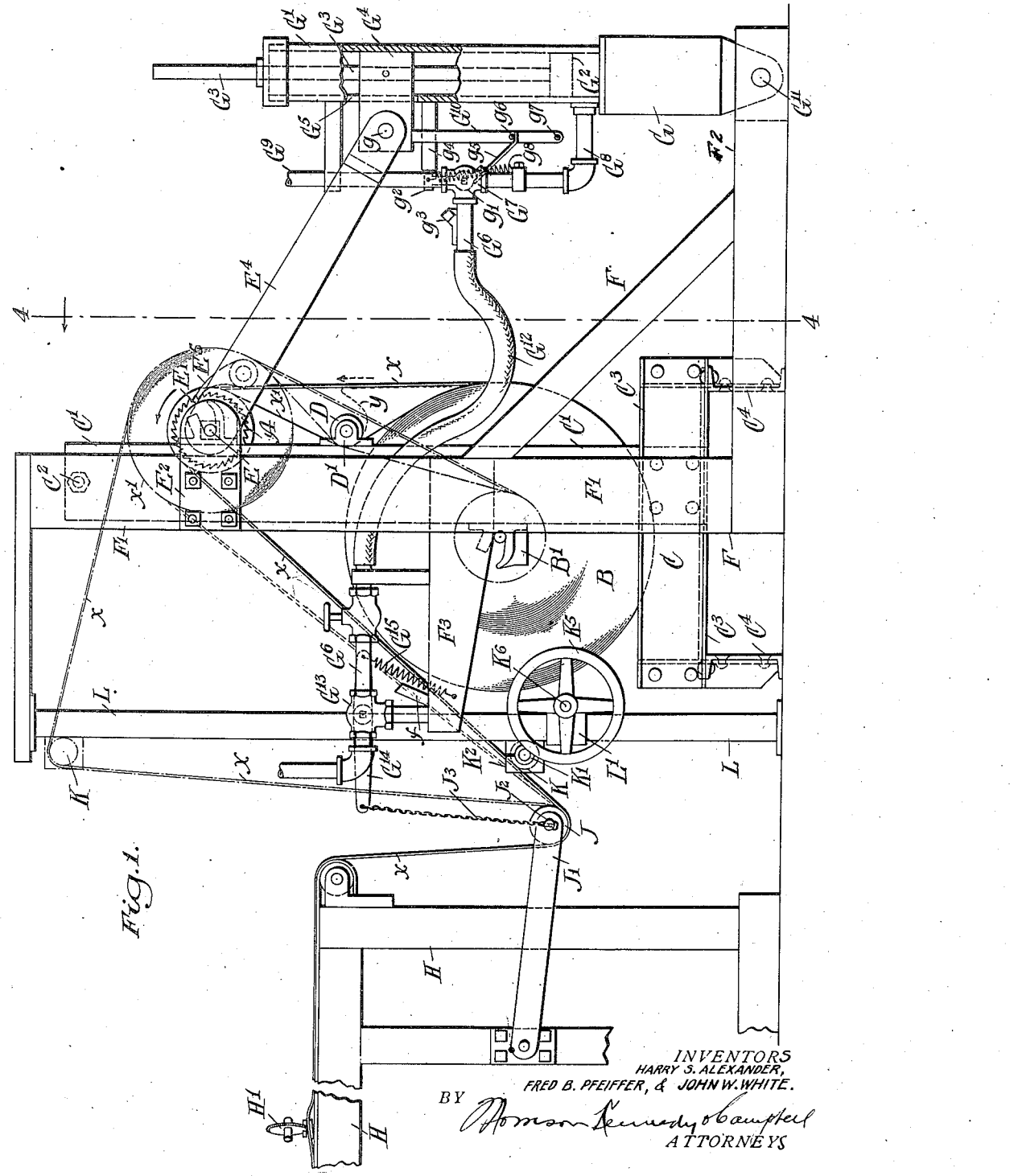

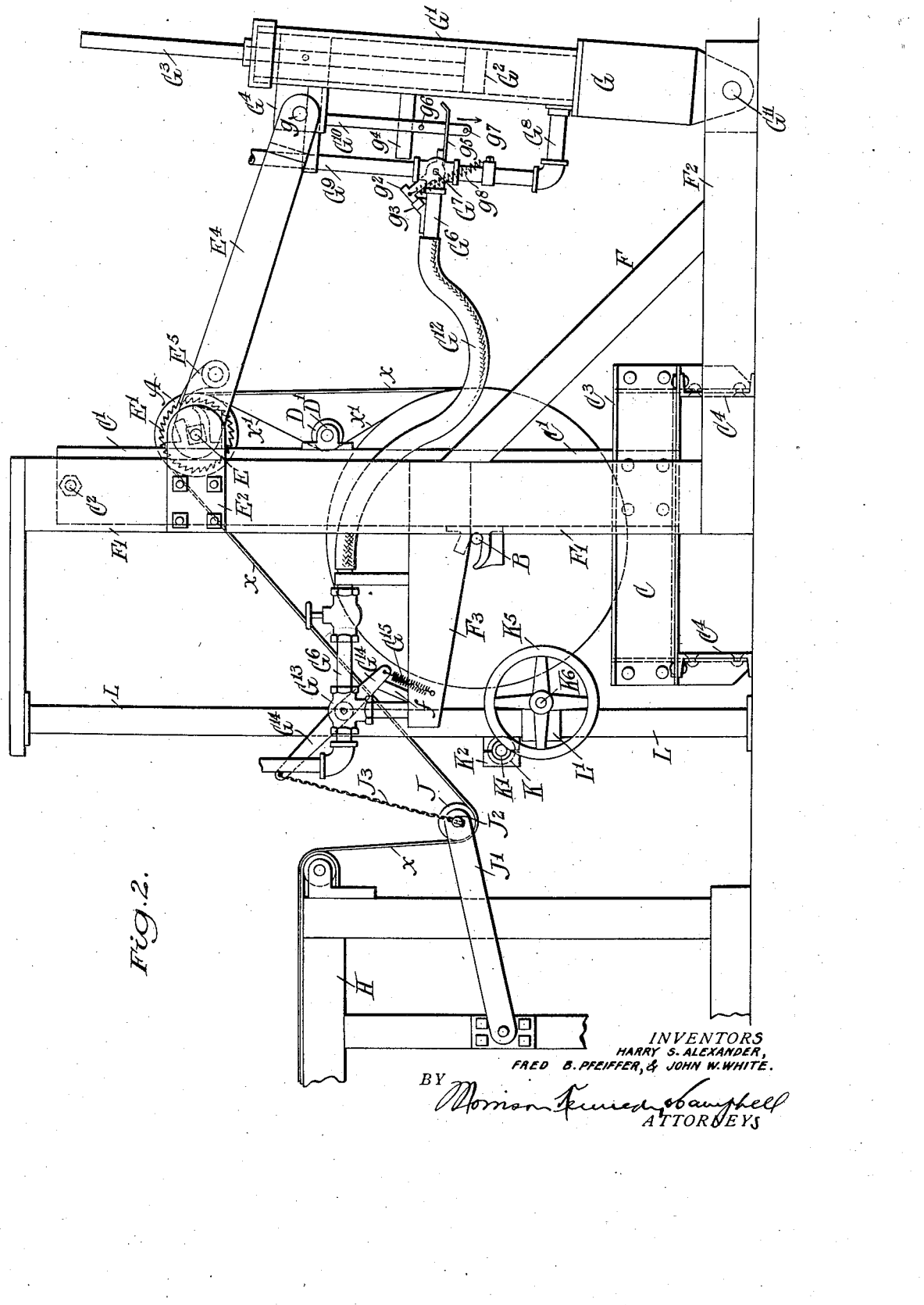

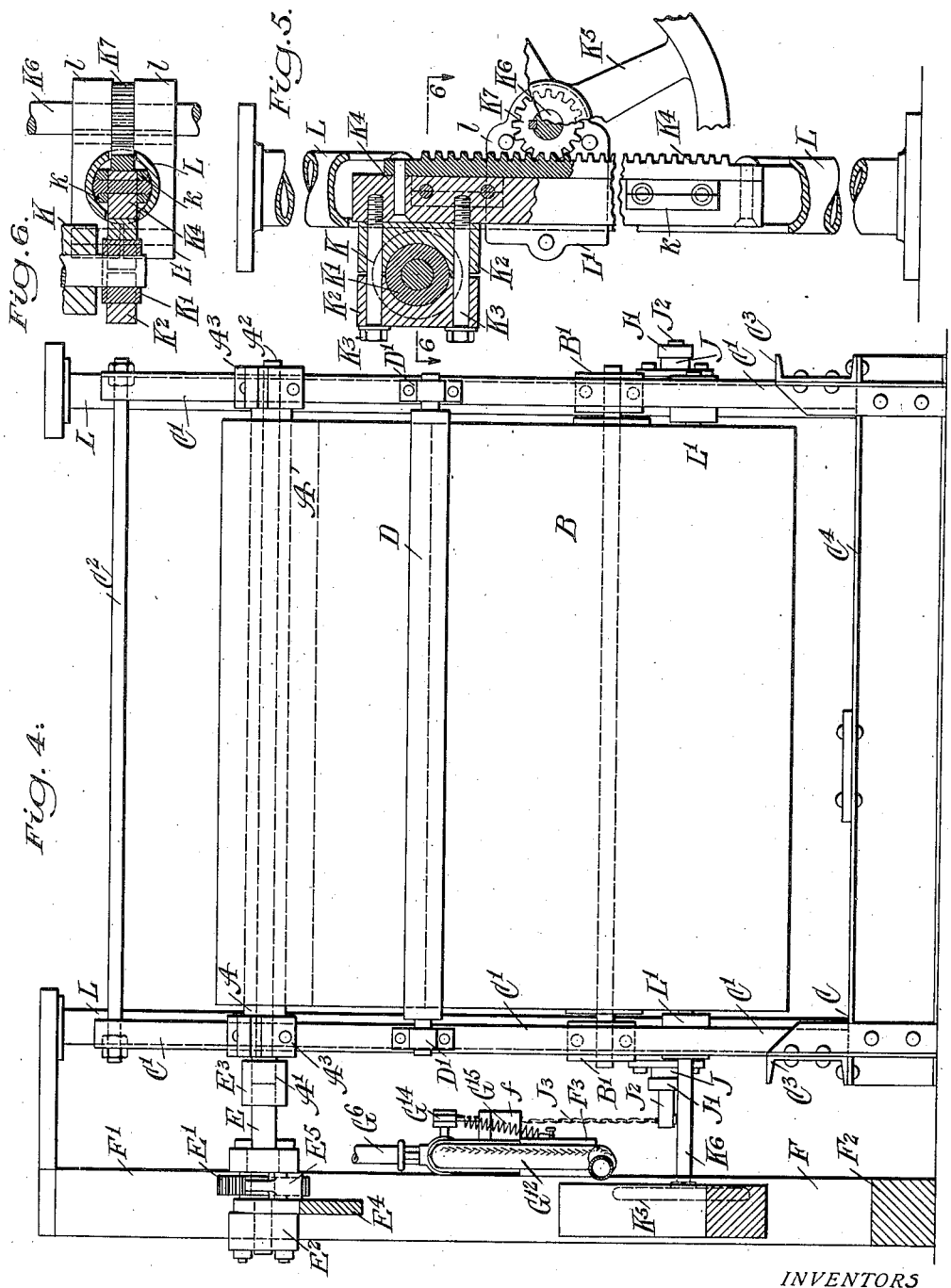

UNITED STATES PATENT OFFICE

HARRY S. ALEXANDER AND FRED B. PFEIFFER, OF AKRON, AND JOHN W. WHITE, OF BARBERTON, OHIO, ASSIGNORS TO SEIBERLING RUBBER COMPANY, A CORPORATION OF DELAWARE

METHOD OF AND APPARATUS FOR SEPARATING SHEET MATERIALS

Application filed August 17, 1928. Serial No. 300,214.

This invention relates to the handling of rubber calendered stock, such as is used in the manufacture of automobile tires, and is directed to a novel method and apparatus for separating such calendered stock from the liners with which it is usually wound.

According to present factory methods, it is customary to wind the calendered stock, whether it be plain sheet rubber or rubberized fabric, onto a stock roll with a cloth liner which prevents the adjacent convolutions of the warm tacky sheets from sticking together. However, due to the firm surface union between the rubberized sheet and the liner, considerable difficulty is later experienced in separating the two sheets for subsequent working, and moreover the adhesion between the two sheets is oftentimes so great that during the separating operation portions of the rubberized sheet are spoiled and the liners themselves ruptured or torn so badly that they have to be discarded. As a result of these objections, considerable time, labor, and material are lost and the cost of production increased accordingly. The problem of compounding the rubber has also been complicated in an endeavor to meet these difficulties by rendering the materials less tacky than is desirable for working conditions.

It has been found by experimentation that one of the best ways to separate the two sheet materials, i. e., the rubberized fabric and the cloth liner, is by jerking them apart, and the present invention therefore provides an apparatus for performing this operation mechanically. To that end, intermittently operated means are employed for feeding the adhering sheets longitudinally by successive jerks or pulls past an idler separating roller arranged between the two sheets and which causes them to diverge as they are unwound from the stock roll. The liner is wound up on an arbor or the like, while the rubber or rubberized fabric is fed over this liner wind-up roll to a bias cutter or other machine where it will be used or operated upon. Provision is also made for quickly connecting and disconnecting the liner wind-up roll (which is the feed roll) to and from the operating mechanism, so that it and the heavy stock roll may be readily removed and replaced by another unit without disturbing the operating mechanism. These and other features and advantages of the invention will be fully understood from the following description in connection with the accompanying drawings wherein one embodiment of the invention has been shown by way of illustration, and wherein Fig. 1 is a side elevation of the improved machine showing the feed mechanism in one position and the control valve closed;

Fig. 2 is a view similar to Fig. 1 showing the feed mechanism in a different position and the control valve open;

Fig. 3 is a top plan view, partly in section, of the parts shown in Fig. 1;

Fig. 4 is a vertical section taken on the line 4—4 of Fig. 1;

Fig. 5 is a detail fragmentary section through one of the posts of the stationary frame structure, showing the means employed for raising and lowering the feed retarding roller; and Fig. 6 is a horizontal section taken on the line 6—6 of Fig. 5.

In carrying out the invention, the rubberized fabric sheet $x$ and the cloth liner $x'$ are drawn off a stock roll B and separated by being passed around the opposite sides of a roller D, after which the liner is wound up on a suitable arbor or roll A, and the rubberized sheet carried to its place of use over the roll A, which, because of its action, will hereafter be referred to as the feed roll. While it is not essential that the rubberized sheet $x$ be passed over the liner roll A, it is desirable to do so, because in that way the linear speed of the rubberized sheet is substantially the same as that of the liner sheet $x'$, and this notwithstanding the fact that the speed of advance of the two sheets is gradually increased as the roll A increases in diameter by the continued winding of the liner thereon. This will be evident from Fig. 1, which shows by the full lines the relative sizes of the stock roll B and the wind-up or feed roll A at the start and by the dotted lines the relative sizes of the two rolls at or near the depletion of the stock roll B.

As best shown in Figs. 1, 2, and 4, the feed or "wind-up" roll A is arranged conveniently above the stock roll B, and both are carried between the upright side members $C^1$ of a supporting frame C. The feed roll A is journaled by means of trunnions $A^1$, $A^2$ in open bearing blocks $A^3$ secured to the frame members $C^1$, and the stock roll B is similarly mounted in open bearing blocks $B^1$ secured to the opposite edge of said frame members. At their upper ends, the side members $C^1$ are braced apart by a stay bolt or tie rod $C^2$ and at their lower ends are secured to a pair of side channel beams $C^3$ supported and connected by a corresponding pair of transverse base channels $C^4$. It will be noted (see Fig. 1) that a rectangular space between the supporting beams $C^4$ and beneath the cross beams $C^3$ is provided for a purpose later to be pointed out.

The frame C also carries an idler separating roller D arranged parallel with the feed and stock rolls at a point about midway between the two and preferably adjacent the outer periphery of the stock roll when the latter is fully wound, although the exact location of the separating roll is immaterial so long as it is capable of performing its separating function. The separating roller D is journalled in suitable bearings $D^1$, also secured to the upright frame members $C^1$ directly below the feed roll A, and is adapted to cause a divergence of the rubberized sheet $x$ and the liner $x^1$ as the material is unwound from the stock roll B.

As a preparatory operation, a short length of the rubber or rubberized fabric material is manually pulled from the liner and the respective sheets $x$, $x'$ passed upwardly on opposite sides of the roller D and over the top of the feed roll A in peripheral engagement therewith, the superposed sheets being thus brought again into surface contact with each other, and as previously stated, the liner will be wound onto the feed roll A while the tacky sheet will be carried over the feed roll to its place of use. The location of the roller D, in relation to the feed and stock rolls, is such that the liner $x'$ will be pulled away from the tacky sheet $x$, while the latter is allowed to travel in a straight path from the stock roll B directly to the feed roll A. As the liner is wound upon the feed roll and as the latter is rotated, the rubberized sheet $x$ is advanced to its place of use, the arc of contact between the sheet and liner roll A being sufficient to feed the former steadily with little, if any, slippage.

The feed roll A, instead of being driven continuously, is rotated intermittently so that the respective sheets of the material, at each successive impulse of the roll A, will be jerked apart in advance of the separating roller D. The mechanism employed for this purpose consists of a ratchet wheel $E^1$ keyed or otherwise secured to a transverse shaft E which is journaled in brackets $E^2$ bolted to the opposite side of an upright member $F^1$ of an L-shaped supporting frame F. The shaft E is axially alined with the feed roll A, and the inner end thereof (Fig. 3) registers with the trunnion $A^1$, so that a driving connection between the two may be quickly made or broken, as desired, by means of a sliding clutch or coupling $E^3$. Rotation of the shaft E and ratchet wheel $E^1$ is effected, in the present instance, by a compressed air motor G through a connecting link $E^4$, the latter being mounted to turn loosely on one end of the shaft E and provided with a gravity pawl $E^5$ which engages with the teeth of the ratchet wheel $E^1$.

The motor G comprises a vertically disposed cylinder $G^1$ containing a reciprocating piston or plunger $G^2$ secured to a piston rod $G^3$. A cross-head $G^4$ is secured to the piston rod $G^3$ and has a portion projecting laterally through an elongated slot $G^5$ in the cylinder wall, so that a connection between the piston and the swinging end of the link $E^4$ may be established. As best shown in Fig. 3, this end of the link is forked to embrace the projecting portion of the cross-head $G^4$ and is pivoted thereto by a cross-pin $g$. Compressed air from a supply pipe $G^6$ is admitted to the lower end of the cylinder $G^1$ below the piston $G^2$ under the control of a three-way valve $G^7$, which latter is arranged between the intake pipe $G^8$ and the exhaust pipe $G^9$ and provided with an operating lever $g^1$. The valve $G^7$ is operated automatically by means of a rod $G^{10}$ which depends from the cross-head $G^4$ and is disposed adjacent the cylinder $G^1$ in parallelism thereto. The shorter arm $g^2$ of the lever $g^1$ swings between a pair of stop shoulders $g^3$, $g^4$ which limit the stroke of the lever in opposite directions to arrest the valve in its open and closed positions, respectively. The longer arm $g^5$ of said lever is located in the path of a pair of projecting studs $g^6$, $g^7$ arranged one above the other on the rod $G^{10}$. A pull spring $g^8$, connected to the lever arm $g^2$ and anchored directly below the valve $G^7$, is employed to hold the lever $g^1$ resiliently against one or the other of the stop shoulders $g^3$, $g^4$ and to facilitate its action therebetween.

It will now be seen that as the piston $G^2$ reciprocates, the link $E^4$ will be rocked about the shaft E and cause the pawl $E^5$ to rotate the feed roll A, step by step, in the direction indicated by the arrow in Fig. 1. Compensation for the arcuate movement of the link $E^4$ is provided by pivoting the motor cylinder $G^1$ at its lower end, as at $G^{11}$, to the horizontal base member $F^2$ of the permanent frame F. The supply pipe $G^6$, for the same reason, is provided with a flexible section $G^{12}$ which permits the cylinder to swing upon its pivotal axis. The application of the intermittent motion to the feed roll not only effects separation of the sheets in the manner before described, but also advances the rubberized sheet at the desired speed to its place of use.

In the present instance, the improved separating apparatus is shown as associated with a bias cutter, altho as previously indicated it could be associated with a tire making machine or used in any other environment depending upon the use to be made of the fabric. The supporting frames C and F are therefore arranged conveniently adjacent the receiving end of a bias cutting machine conventionally indicated by the letter H (see Figs. 1 and 2), so that the sheet $x'$ may pass thereto directly from the feed roll A. In the bias cutter herein illustrated, the material is cut into strips by a tool $H^1$ operating diagonally across the table, the material being fed forward manually the proper distance according to the width of the cut strips and at a speed determined by the operator. Since, however, the material is fed mechanically from the stock roll to the bias cutter, means are herein provided for automatically controlling the operation of the motor G to compensate for any difference in the rates of feeding. Such means, in the embodiment illustrated, consists of a balance roller J which is journaled in the extremities of a pair of rocking arms $J^1$ pivoted to the opposite sides of the bias cutter H and arranged to float upon the rubberized sheet $x$ on its way to the cutter. This floating roller J is intended to re-act upon the material in the manner required and at the same time keep it under a slight tension. Consequently, if the cutting of the material be delayed or the latter be fed through the bias cutter at a speed less than that at which it is advanced by the feed roll A, the slack will increase and allow the balance roller J to descend. On the other hand, if the rate of the cutter feed exceeds that of the roll A, the slack in the material will be correspondingly decreased and the roller J caused to rise therewith. In the latter event, it will be obvious that the motor G should continue to function in order to keep up the feed of the material to the bias cutter, whereas in the former event the motor should cease its operation until the slack in the material has been absorbed.

In carrying out this phase of the invention, therefore, the supply pipe $G^6$ is provided with a two-way valve $G^{13}$ which is automatically controlled by the rise and fall of the roller J. The valve $G^{13}$ (as best shown in Figs. 1 and 2) is supported conveniently near said roller upon a horizontally disposed bracket arm $F^3$ secured to the upright member $F^1$ of the frame F and is provided with a rocking lever $G^{14}$ which is adapted, when occupying the horizontal position shown in Fig. 1, to shut off the air supply to the control valve $G^7$ and, when rocked upwardly to the position shown in Fig. 2, to open said air supply. In the open position of the valve, the lever $G^{14}$ banks upon a fixed stop $f$ (Fig. 2) where it is yieldingly maintained by a spring $G^{15}$ which is attached to one arm of the lever and anchored to the bracket arm $F^3$. The other arm of the lever $G^{14}$ is connected to the roller J by a chain $J^3$ attached to a rod $J^2$ protruding from one of the arms $J^1$ and on which the roller J is journaled, the chain permitting a relative movement between the lever and roller when the valve is open, altho it will be understood that the movement required to open and close the valve is considerably less than that of the roller. The closing of the valve $G^{13}$ is effected by the roller J as the latter descends, the spring $G^{15}$ at such times serving to counterbalance the weight of said roller.

In the course of feeding a roll of stock to the bias cutting machine, it has been found in practice that, for one reason or another, (e. g., a slightly increased linear speed of the rubberized sheet $x$ or stretching of the cloth liner $x^1$) "festoons" will occasionally form in the liner adjacent the separating roll D (see dotted lines $y$, Fig. 1). In overcoming this difficulty, it is proposed to lift the rubberized sheet $x$ to a point above the level of the feed roll A so that the arc of contact between the sheet and the liner will be decreased sufficiently to permit slippage of the liner past the sheet and allow the roll to wind up the festooned portion. The means provided for this purpose comprises a roller K mounted at its opposite ends in bushings $K^1$ and arranged transversely beneath the sheet, adjacent the floating roller J (Fig. 1). The bushings $K^1$ (see Figs. 6 and 7) are carried between a pair of blocks $K^2$ secured by clamping bolts $K^3$ to vertically movable rack bars $K^4$. These rack bars (one being employed to raise each end of the roller K) are slidably mounted and properly guided by anti-friction plates $k$ in hollow, cylindrical posts L which are permanently secured to the floor and constitute parts of the stationary frame work of the separating apparatus. The raising and lowering of the rack bars $K^4$ and roller K is manually effected by means of a hand wheel $K^5$ keyed to a rock shaft $K^6$, which latter is rotatably mounted in bearing brackets $L^1$ clamped to the posts L and arranged parallel to the roller K. The bearing brackets $L^1$ (as best shown in Figs. 5 and 6) are made in two sections $l$ adapted to support pinions $K^7$ which are keyed to the shaft $K^6$ and located between the bracket sections in mesh with the teeth of the rack bars $K^4$. According to this arrangement, by rotating the hand wheel in a clockwise direction as viewed in Fig. 1, the roller K may be raised to the desired height such as indicated by the dotted lines in said figure, and after the "festoon"

has been wound up on the feed roll, the hand wheel may be turned in the opposite direction to lower the roller K to its original position. In this latter position, it will be noted (see Fig. 1) that the roller K serves to support or guide the material in a plane that will clear a stock roll of the maximum diameter.

It is pointed out that by mounting the feed and stock rolls A and B in the separate portable frame C and providing the coupling E³ for the instant making and breaking of the driving connection between the feed roll and its rotating mechanism, considerable time and labor is saved when replenishing the stock supply and the interruption in the operation of the bias cutting machine at such times is correspondingly shortened. That is to say, after the clutch E³ is disengaged from the feed roll, the frame C may be readily moved about upon a low lift truck or skid, (not shown) which is run between the two side beams C⁴ of the frame C so as to occupy the rectangular space, previously mentioned, beneath the cross beams C³. These operations, together with the lifting of the frame, may be quickly effected, and as soon as the frame is moved out of the way, another frame with a fresh supply of material may be placed in operative position. The portability of said frame also facilitates the transportation of both stock and liner rolls to and from the calender machine, besides presenting them in a convenient position for removal. Moreover, the stock rolls, as they come from the calender, may be either stored in these frames or they may be taken therefrom directly to the bias cutter.

The invention is devoted primarily to the separation of a rubberized fabric sheet from a liner in the novel manner described, and it will be obvious that many other forms of devices or apparatus for jerking the material apart will readily suggest themselves to those skilled in the art and still be comprised within the scope of the invention. For example, the feed roll might be driven continuously and operate, by means of cams or eccentrics, a subsidiary device arranged between the sheets to force them apart by sudden, intermittent, lateral movements as the material is being fed to the bias cutter. It should therefore be understood that the invention is not limited to any specific form or embodiment except insofar as such limitations are specified in the claims.

Having thus described our invention, what we claim and desire to secure by Letters Patent of the United States, is as follows:

1. In a machine for separating joined sheet materials, the combination of means for feeding the materials longitudinally, and means disposed in the path of the material for causing a divergence of the respective sheets, said feeding means operating directly on the sheets to jerk them apart.

2. In a machine for separating joined sheet materials, the combination of mechanism for feeding the materials longitudinally, and a roller disposed in the path of the materials for causing a divergence of the respective sheets, said feeding mechanism operating intermittently to advance the sheets by successive jerks or pulls, for the purpose described.

3. In a machine of the class described, the combination of means for supporting a stock roll of joined sheet materials, and mechanism for unwinding the materials from the roll, said mechanism including means disposed in the path of the material for causing a divergence of the respective sheets and a feed roll operating intermittently and acting directly on the sheets to separate them by successive jerks as they are unwound from the stock roll.

4. In a machine of the class described, the combination of means for supporting a stock roll of joined sheet materials, and mechanism for unwinding the materials from the roll, said mechanism being operated intermittently to jerk the sheets apart as they are unwound from the stock roll.

5. In a machine for separating joined sheet materials, the combination of means for feeding the materials longitudinally, means arranged in advance of said feeding means for causing a divergence of the respective sheets, and means for operating the feeding means to act directly on the joined sheets so as to jerk apart the respective sheets.

6. In a machine for separating joined sheet materials, the combination of a feed roll for drawing the materials from a source of supply, means arranged in a fixed location between said roll and the source of supply for causing a divergence of the respective sheets, and means for imparting intermittent motion to the feed roll so as to jerk the sheets apart in advance of said means.

7. In a machine for separating joined sheet materials, the combination of a feed roll for drawing the materials longitudinally, a separating roller arranged in advance of the feed roll for causing a divergence of the respective sheets, and means for imparting partial rotations to the feed roll so as to jerk the sheets apart in advance of the separating roller.

8. In a machine of the class described, the combination of means for supporting a stock roll of joined sheet materials, a feed roll for unwinding the materials therefrom, means arranged between said rolls for causing a divergence of the respective sheets, and means for imparting rapid intermittent motion to the feed roll to jerk the sheets apart as they are unwound from the stock roll.

9. In a machine for separating joined sheet materials, the combination of means for feeding the materials longitudinally, means arranged in advance of said feed means for causing a divergence of the respective sheets, and a power-operated ratchet device for imparting intermittent motion to the feed means, whereby the sheets are jerked apart as they are advanced by the feed means.

10. In a machine for separating joined sheet materials, the combination of means for feeding the materials longitudinally, means arranged in advance of said feed means for causing a divergence of the respective sheets, power actuated mechanism for imparting intermittent motion to the feed means, and means for starting and stopping the operation of said power mechanism automatically.

11. In a machine for separating joined sheet materials, the combination of means for feeding the materials longitudinally, means arranged in advance of said feed means for causing a divergence of the respective sheets, a ratchet device for imparting intermittent rotation to the feed means, power-actuated means for operating the ratchet device, and means for starting and stopping the operation of said power mechanism automatically, said means including a floating roller operated by one of the separated sheets to control the action of the starting and stopping means.

12. In a machine for separating joined sheet materials, the combination of means for feeding the materials longitudinally, means arranged in advance of said feed means for causing a divergence of the respective sheets, a ratchet device for imparting intermittent motion to the feed means, a reciprocating plunger or piston for operating said ratchet device, and automatic means for rendering the piston active or inactive, as required.

13. In a machine for separating rubberized fabric from a liner, the combination of a roll for winding up the liner and for feeding the rubberized fabric thereover, a power-actuated mechanism, including a pressure cylinder and a piston, for imparting intermittent motion to the feed roll, a valve for controlling admission and exhaust of pressure fluid to and from the cylinder, and means for operating the valve in synchronism with the reciprocations of the piston.

14. In a mechanism for separating rubberized fabric from a liner, a roll for winding up the liner and for feeding the rubberized fabric thereover, means for causing a divergence of the fabric and liner in advance of the feed roll, and means for retarding the movement of the fabric to take up slack or festoons in the liner.

15. In a mechanism for separating rubberized fabric from a liner, a roll for winding up the liner and for feeding the rubberized fabric thereover, means for causing a divergence of the fabric and liner in advance of the feed roller, and means for decreasing the arc of contact of the fabric sheet with the feed roll in order to retard the movement of the fabric.

16. In a machine for separating rubberized fabric from a liner, the combination of a roll for winding up the liner and for feeding the rubberized fabric thereover, means for causing a divergence of the fabric and the liner in advance of the feed roll, and means for changing the course of the fabric sheet beyond the feed roll to decrease or increase the arc of its contact with said roll, in the manner and for the purpose described.

17. In a machine for separating joined sheet materials, the combination with means for supporting a stock roll which includes a liner and a rubberized fabric, a roll for drawing the material therefrom and for winding up the liner, means arranged between said rolls for separating the respective sheets, and a portable supporting frame wherein said elements are mounted, of a separate supporting frame equipped with power-actuated means for driving the feed roll, and means for making or breaking the driving connection between the feed roll and said power-actuated means, as desired.

18. In a machine for separating joined sheet materials, the combination with means for supporting a stock roll which includes a liner and a rubberized fabric, a roll for drawing the material therefrom, means arranged between said rolls for separating the respective sheets, and a portable supporting frame wherein said elements are mounted, of a separate supporting frame equipped with power-actuated means for rotating the feed roll intermittently, and means for making and breaking the driving connection between the feed roll and said power-actuated means, as desired.

19. In a machine for separating joined sheet materials, the combination with means for supporting a stock roll which includes a liner and a rubberized fabric, a roll for drawing the material therefrom and for winding up the liner, means arranged between said rolls for separating the respective sheets, and a portable supporting frame wherein said elements are mounted, of a separate supporting frame equipped with a ratchet device for turning the feed roll and with means for operating said device by power, and means for coupling and uncoupling the feed roll to and from the ratchet device, as desired.

20. A method of separating joined sheet materials, which consists in feeding the materials longitudinally by successive jerks or pulls, and causing a divergence of the respective sheets as they are so fed.

21. A method of separating joined sheet materials from a stock roll on which they are wound, which consists in unwinding the materials by short successive jerks or pulls, and causing a divergence of the respective sheets adjacent the roll as they are unwound therefrom.

22. A method of separating joined sheet materials, which consists in passing the sheets around opposite sides of a roller to cause them to diverge, and jerking or pulling the sheets past the roller to effect their separation.

23. The method of separating joined sheet materials, which consists in feeding the sheets longitudinally, causing them to diverge as they move, winding up one of the sheets in a roll, and guiding the other over and in contact with the roll so formed.

24. The method of separating joined sheet materials, which consists in feeding the sheets longitudinally in quick successive jerks or pulls, and guiding them around opposite sides of a separating member as they are so fed.

25. The method of separating a tacky sheet from a liner, which consists in causing the two sheets to diverge, winding up the liner by itself in a roll, and passing the tacky sheet over the roll so formed in frictional engagement with part of the periphery thereof.

In testimony whereof, we have affixed our signatures hereto.

HARRY S. ALEXANDER.
FRED B. PFEIFFER.
JOHN W. WHITE.